US012766995B2

(12) United States Patent
Moriya et al.

(10) Patent No.: US 12,766,995 B2
(45) Date of Patent: Oct. 20, 2026

(54) INFORMATION PROCESSING METHOD

(71) Applicant: TOYOTA JIDOSHA KABUSHIKI KAISHA, Toyota (JP)

(72) Inventors: Koki Moriya, Nagakute (JP); Hiroki Takeishi, Machida (JP); Ibuki Shimada, Miyoshi (JP); Koji Ueda, Hunabashi (JP); Ai Miyata, Hirakata (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 383 days.

(21) Appl. No.: 18/532,302

(22) Filed: Dec. 7, 2023

(65) Prior Publication Data

US 2024/0246447 A1 Jul. 25, 2024

(30) Foreign Application Priority Data

Jan. 25, 2023 (JP) ................................ 2023-009648

(51) Int. Cl.
*B60L 53/68* (2019.01)
*B60L 53/16* (2019.01)
*H02J 7/40* (2026.01)

(52) U.S. Cl.
CPC ............... *B60L 53/68* (2019.02); *B60L 53/16* (2019.02); *H02J 7/40* (2026.01); *B60L 2250/00* (2013.01)

(58) Field of Classification Search
CPC .......... B60L 53/16; B60L 53/34; B60L 53/35; B60L 53/36; B60L 53/37; B60L 53/60; B60L 53/66; B60L 53/67; B60L 53/68; H02J 7/40
USPC .......................................................... 700/295
See application file for complete search history.

(56) References Cited

U.S. PATENT DOCUMENTS

| | | | | |
|---|---|---|---|---|
| 10,286,802 | B2 * | 5/2019 | Kim | B60L 53/68 |
| 10,647,214 | B2 * | 5/2020 | Solomon | G07C 9/27 |
| 11,180,034 | B2 * | 11/2021 | Reynolds | B60L 53/305 |
| 12,054,070 | B2 * | 8/2024 | Reynolds | B60L 53/30 |
| 12,649,381 | B2 * | 6/2026 | Ogaki | B60L 53/68 |
| 2024/0083292 | A1 * | 3/2024 | Siddique | B60L 53/11 |

FOREIGN PATENT DOCUMENTS

| | | | | |
|---|---|---|---|---|
| CN | 102763302 A | * 10/2012 | B60L 53/305 |
| CN | 109080487 B | * 4/2021 | |
| JP | 2011107929 A | * 6/2011 | |

(Continued)

OTHER PUBLICATIONS

NIO Limited, "NIO Power", [online], 2022, [Searched on Dec. 14, 2022], Internet <URL: https://www.nio.com/nio-power>.

*Primary Examiner* — Crystal J Barnes-Bullock
(74) *Attorney, Agent, or Firm* — SoraIP, Inc.

(57) ABSTRACT

An information processing method using an information processing device, which includes receiving an electric power feed request to a vehicle from a user terminal, determining an installer who installs a charger for power supply based on the electric power feed request, and determining a charging position. transmitting installation work information indicating at least the time of installation to the installer terminal; determining a person to remove the charger from the electric power feed request; and removing work information indicating at least the charging position and the removal time to the retriever terminal.

4 Claims, 6 Drawing Sheets

(56) References Cited

FOREIGN PATENT DOCUMENTS

| | | | | | |
|---|---|---|---|---|---|
| JP | 2011227541 | A | * | 11/2011 | |
| JP | 2022152896 | A | * | 10/2022 | |
| JP | 7420596 | B2 | * | 1/2024 | G06Q 20/14 |
| JP | 7535921 | B2 | * | 8/2024 | |
| KR | 101261272 | B1 | * | 5/2013 | B60L 53/65 |
| KR | 101488674 | B1 | * | 2/2015 | H02J 7/00 |
| KR | 101828593 | B1 | * | 3/2018 | G06Q 20/14 |
| KR | 20180100986 | A | * | 9/2018 | B60L 11/1824 |
| KR | 20180100987 | A | * | 9/2018 | H04W 4/12 |
| KR | 20200031221 | A | * | 3/2020 | B60L 53/60 |
| KR | 20200031222 | A | * | 3/2020 | B60L 53/60 |
| KR | 20200034245 | A | * | 3/2020 | B60L 53/60 |
| KR | 20200063307 | A | * | 6/2020 | G06Q 50/30 |
| KR | 20230118724 | A | * | 8/2023 | B60L 3/0092 |
| KR | 20230173359 | A | * | 12/2023 | B60L 53/35 |
| WO | WO-2016047944 | A1 | * | 3/2016 | G07F 15/06 |
| WO | WO-2020027265 | A1 | * | 2/2020 | G06Q 50/10 |
| WO | WO-2021219669 | A1 | * | 11/2021 | B60L 53/57 |
| WO | WO-2024089823 | A1 | * | 5/2024 | B60L 53/60 |

* cited by examiner

FIG. 6

| USER | CHARGING POSITION | INSTALLATION TIME | WITHDRAWAL TIME | INSTALLER | RETRIEVER |
|---|---|---|---|---|---|
| P1 | L01 | JANUARY 17TH 11:00 | JANUARY 17TH 12:00 | SP1 | TP1 |
| ... | ... | ... | ... | ... | ... |

INFORMATION PROCESSING METHOD

CROSS-REFERENCE TO RELATED APPLICATION

This application claims priority to Japanese Patent Application No. 2023-009648 filed on Jan. 25, 2023, incorporated herein by reference in its entirety.

BACKGROUND

1. Technical Field

The present disclosure relates to an information processing method.

2. Description of Related Art

There conventionally is known a service in which, upon an electric power feeding request to an own vehicle being made through an app, an electric power feeding vehicle rushes to the own vehicle and performs electric power feeding thereto (see, for example, NIO LIMITED, "NIO Power", [online], 2022, [Retrieved Dec. 14, 2022], Internet <URL: https://www.nio.com/nio-power>).

SUMMARY

In the above-described background art, no consideration is given to improving efficiency of installation work and retrieval work of a charger.

An object of the present disclosure, which has been made in view of such circumstances, is to improve the efficiency of the installation work and the retrieval work of the charger.

An information processing method according to an embodiment of the present disclosure is an information processing method performed by an information processing device, and includes

- receiving an electric power feed request for a vehicle from a user terminal,
- determining an installer to perform installation work of a charger for electric power feed, from the electric power feed request, and transmitting installation work information indicating at least a charging location and an installation time to an installer terminal, and
- determining, from the electric power feed request, a retriever to perform retrieval work of the charger, and transmitting retrieval work information indicating at least the charging location and a retrieval time to a retriever terminal.

According to an embodiment of the present disclosure, the installation work and the retrieval work of the charger can be made to be more efficient.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram showing the data structure of the charging DB (database).

DETAILED DESCRIPTION OF EMBODIMENTS

Figure 1:
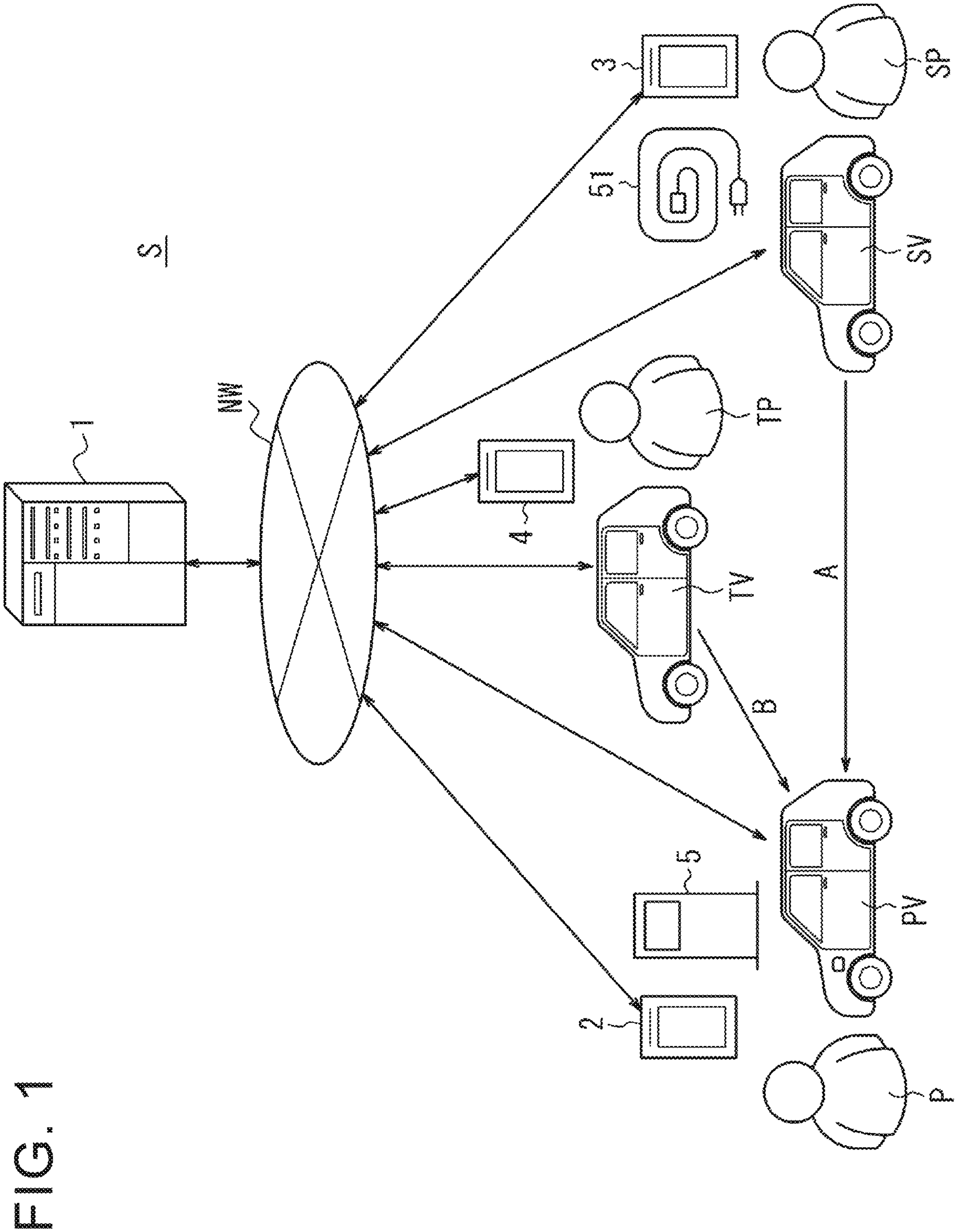
FIG. 1 is a schematic diagram of an information processing system.

FIG. 1 is a schematic diagram of an information processing system S according to the present embodiment. The information processing system S includes an information processing device 1, a user terminal 2, an installer terminal 3, and a retriever terminal 4 that can communicate with each other via a network NW. Network NW includes, for example, a mobile communication network, a fixed communication network, or the Internet.

A user P operates the user terminal 2. The user P drives or rides the vehicle PV. The installer terminal 3 is operated by the installer SP. The installer SP drives or rides the installer vehicle SV. The installer vehicle SV moves along with the charger 51 in direction A to the position of the vehicle PV. The installer SP connects the charging device 5 in the vicinity of the vehicle PV to the vehicle PV using the charger 51, and performs electric power feed from the charging device 5 to the vehicle PV. As an example here, the vehicle PV is a battery electric vehicle including a battery, but is not limited to this. Alternatively, the installer SP may not be in the installer vehicle SV.

The retriever terminal 4 is operated by the retriever TP. The retriever TP drives the retriever vehicle TV or gets on the retriever vehicle TV. The retriever vehicle TV moves in direction B to the position of the vehicle PV. The retriever TP withdraws the charger 51. That is, the retriever TP leaves the charging position of the vehicle PV after retrieving the charger 51. Alternatively, the retriever TP does not have to board the retriever vehicle TV.

For simplicity of explanation, FIG. 1 shows one information processing device 1, one user terminal 2, one installer terminal 3, and one retriever terminal 4. However, the number of each of the information processing device 1, the user terminal 2, the installer terminal 3, and the retriever terminal 4 is not limited to this. For example, the processes executed by the information processing device 1 according to the present embodiment may be executed by a plurality of the information processing devices 1 disposed in a distributed manner.

The information processing device 1 is installed in facilities such as a data center. The information processing device 1 is, for example, a computer such as a server belonging to a cloud computing system or other computing systems.

Figure 2:
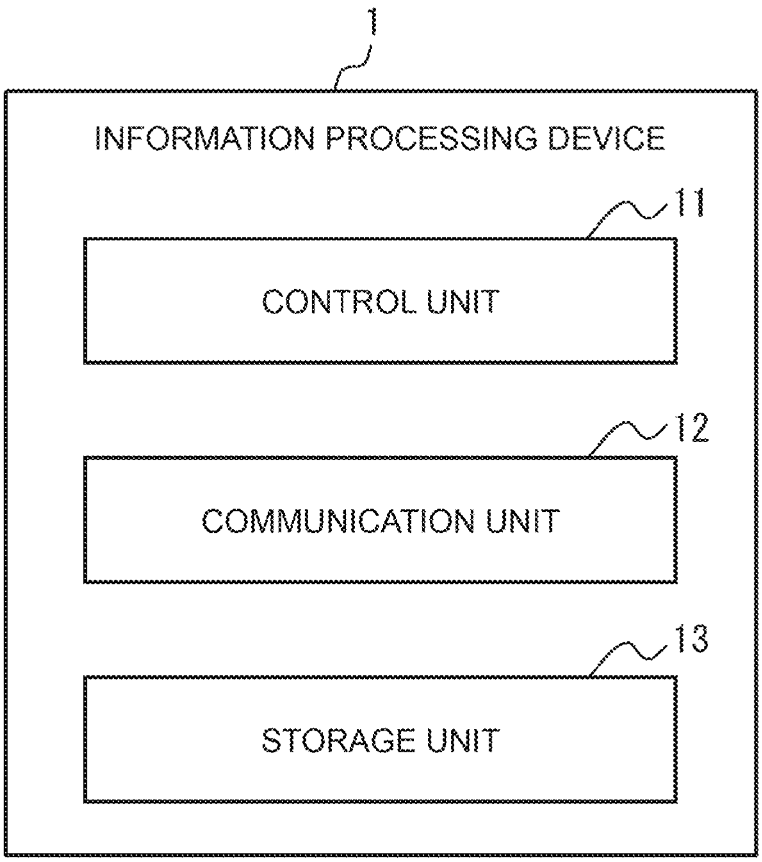
FIG. 2 is a block diagram showing the configuration of an information processing device.

In FIG. 2, the internal configuration of the information processing device 1 will be described in detail.

The information processing device 1 includes the control unit 11, the communication unit 12, and a storage unit 13. The constituent components of the information processing device 1 are connected so as to be able to communicate with each other via a dedicated line, for example.

The control unit 11 includes, for example, one or more general-purpose processors including a Central Processing Unit (CPU) or a Micro Processing Unit (MPU). The control unit 11 may include one or more dedicated processors specialized for a specific process. The control unit 11 may include one or more dedicated circuits instead of including the processor. A dedicated circuit may be, for example, a Field-Programmable Gate Array (FPGA) or an Application Specific Integrated Circuit (ASIC). The control unit 11 may include an Electronic Control Unit (ECU). The control unit 11 transmits and receives information via the communication unit 12.

The communication unit 12 includes a communication module compatible with one or more wired or wireless Local Area Network (LAN) standards for connecting to the network NW. The communication unit 12 may include modules compatible with one or more mobile communication standards including Long Term Evolution (LTE), 4th Generation (4G), or 5th Generation (5G). The communication unit 12 may include a communication module and the like conforming to one or more short-range communication standards or specifications including Bluetooth (registered trademark), Air Drop (registered trademark), infrared data association (IrDA), ZigBee (registered trademark), FeliCa (registered trademark), or radio frequency identifier (RFID). The communication unit 12 transmits and receives information via the network NW.

The storage unit 13 includes a semiconductor memory, a magnetic memory, an optical memory, or a combination of at least two of them. However, the disclosure is not limited to this. The semiconductor memory is, for example, a random access memory (RAM) or a read-only memory (ROM). The RAM is, for example, a static random access memory (SRAM) or a dynamic random access memory (DRAM). The ROM is, for example, an electrically erasable programmable read-only memory (EEPROM). The storage unit 13 may function as, for example, a main storage device, an auxiliary storage device, or a cache memory. The storage unit 13 may store information on the result of analysis or processing by the control unit 11. The storage unit 13 may store various kinds of information and the like related to the operation or control of the information processing device 1. The storage unit 13 may store a system program, an application program, embedded software, and the like. The storage unit 13 may be provided outside the information processing device 1 and accessed from the information processing device 1. Storage unit 13 includes a charging DB.

The user terminal 2 is, for example, a mobile terminal such as a mobile phone, a smart phone, a wearable device, or a tablet. Alternatively, the user terminal 2 may be a general purpose device such as a personal computer (PC) or a dedicated device.

Figure 3:
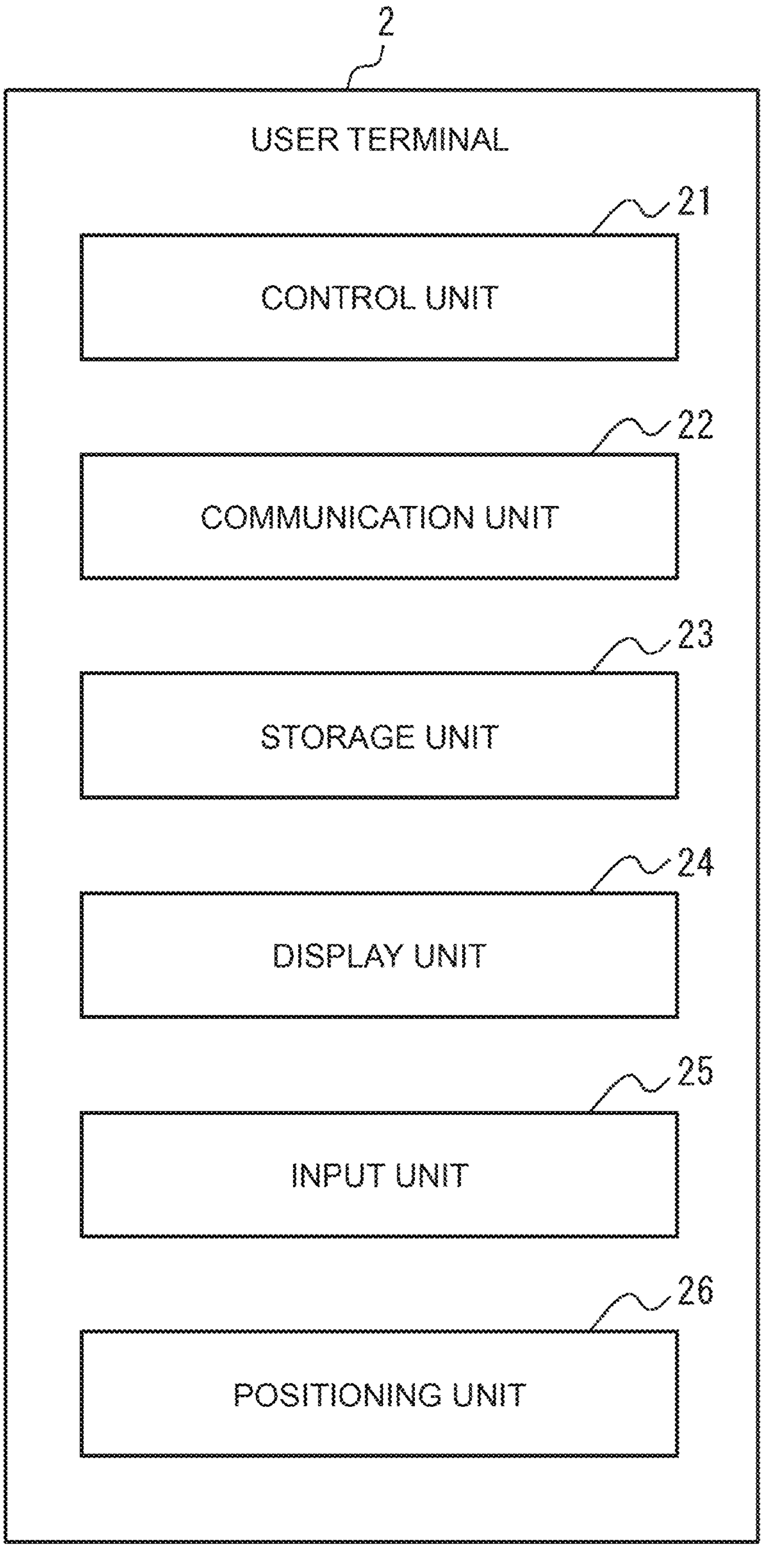
FIG. 3 is a block diagram showing the configuration of a user terminal.

In FIG. 3, the internal configuration of the user terminal 2 is explained in detail.

The user terminal 2 includes a control unit 21, a communication unit 22, a storage unit 23, a display unit 24, an input unit 25 and a positioning unit 26. Each component of the user terminal 2 is communicably connected to each other via a dedicated line, for example.

The description of the hardware configuration of the control unit 21, the communication unit 22, and the storage unit 23 of the user terminal 2 may be the same as the description of the hardware configuration of the control unit 11, the communication unit 12, and the storage unit 13 of the information processing device 1. The description here is omitted.

The display unit 24 is, for example, a display. The display is for example a liquid crystal display (LCD) or an organic electro luminescence (EL) display. The display unit 24 may be connected to the user terminal 2 as an external output device instead of being provided in the user terminal 2. As the connection method, for example, any method such as Universal Serial Bus (USB), High-Definition Multimedia Interface (HDMI) (registered trademark), or Bluetooth (registered trademark) can be used.

The input unit 25 is, for example, a physical key, a capacitive key, a pointing device, a touch screen integrated with a display, or a microphone. The input unit 25 receives an operation of inputting information used for the operation of the user terminal 2. The input unit 25 may be connected to the user terminal 2 as an external input device instead of being provided in the user terminal 2. As a connection method, for example, any method such as a universal serial bus (USB), a high-definition multimedia interface (HDMI) (registered trademark), or Bluetooth (registered trademark) can be used.

The positioning unit 26 includes at least one Global Navigation Satellite System (GNSS) receiver. "GNSS includes, for example, Global Positioning System (GPS), Quasi-Zenith Satellite System (QZSS), BeiDou, Global Navigation Satellite System (GLONASS), and/or Galileo. The satellites of the QZSS are referred to as quasi-zenith satellites. The positioning unit 26 acquires position information. "Positional information" is information that can identify the position of the user terminal 2, and includes coordinates, for example.

Figure 4:
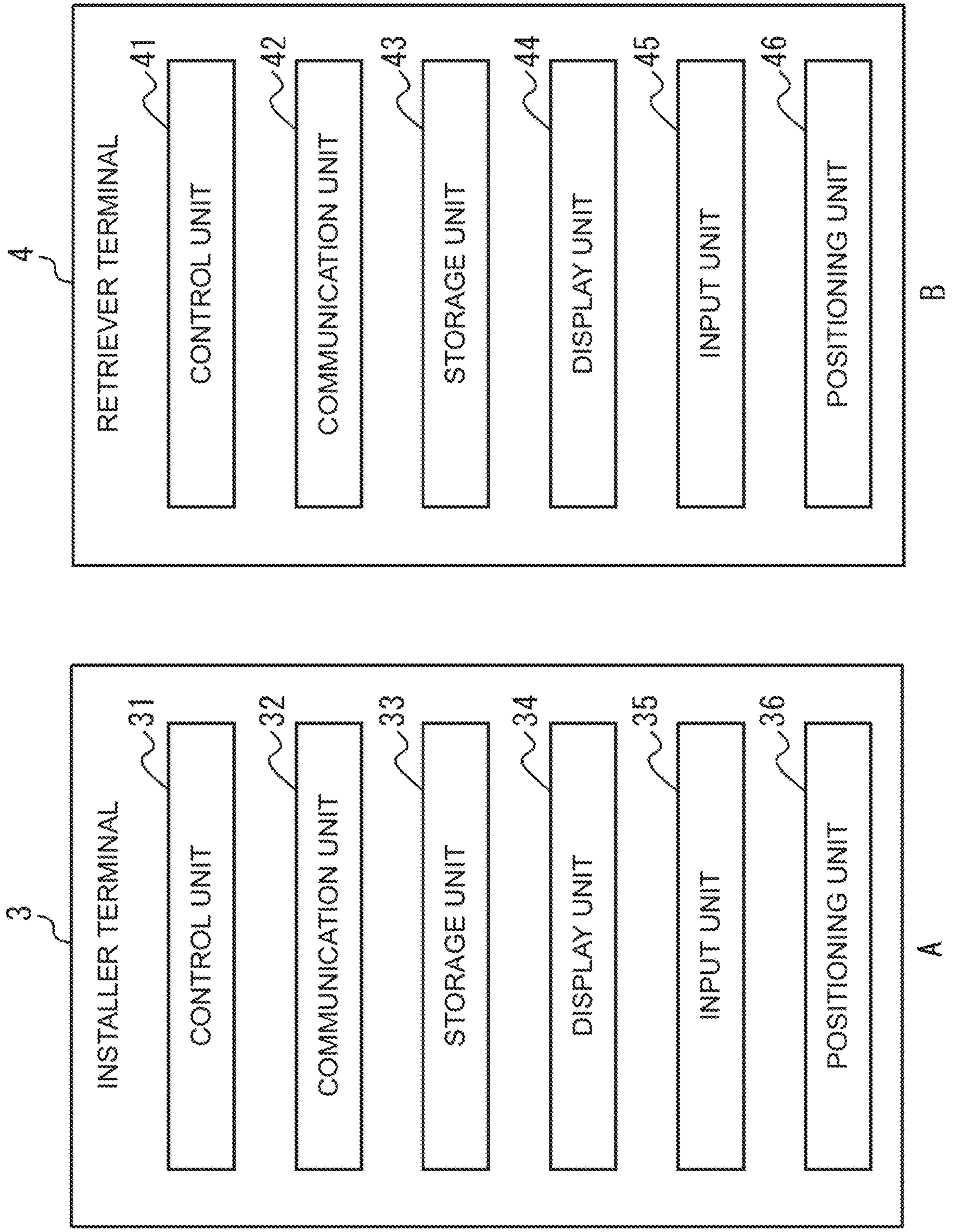
FIG. 4 is a block diagram showing the configuration of the installer's terminal and the retriever's terminal.

In A of FIG. 4, the internal configuration of the installer terminal 3 is described in detail.

The installer terminal 3 includes a control unit 31, a communication unit 32, a storage unit 33, a display unit 34, an input unit 35 and a positioning unit 36. Each component of the installer terminal 3 is communicably connected to each other via a dedicated line, for example.

The description of the hardware configuration of the control unit 31, the communication unit 32, the storage unit 33, the display unit 34, the input unit 35, and the positioning unit 36 of the installer terminal 3 is given in the description of the control unit 21, the communication unit 22, and the description of the hardware configuration of the storage unit 23, display unit 24, input unit 25, and positioning unit 26 of the user terminal 2 may be the same. The description here is omitted.

In B of FIG. 4, the internal configuration of the retriever terminal 4 is described in detail.

The retriever terminal 4 includes a control unit 41, a communication unit 42, a storage unit 43, a display unit 44, an input unit 45 and a positioning unit 46. Each component of the retriever terminal 4 is communicably connected to each other via a dedicated line, for example.

The hardware configuration of the control unit 41, the communication unit 42, the storage unit 43, the display unit 44, the input unit 45, and the positioning unit 46 of the retriever terminal 4 is described in the control unit 31 and the communication unit 32 of the installer terminal 3, the storage unit 33, the display unit 34, the input unit 35 and the positioning unit 36. The description here is omitted.

Hereinafter, the information processing method by the information processing device 1 will be described in detail with reference to FIG. 5. Here, as an example, a scene in which the user P operates the user terminal 2 to request electric power feed to the vehicle PV will be described.

At S1, the control unit 11 of the information processing device 1 receives an electric power feed request for the vehicle PV from the user terminal 2. For example, the electric power feed request is associated with the vehicle PV or location information of the user terminal 2 by the user terminal 2. Electric power feed is performed at the charging position corresponding to the associated position information. The user terminal 2 may accept an electric power feed request at the earliest possible time from the user P, or may accept an electric power feed request within a wide chargeable period. When a wide chargeable period is specified, the control unit 11 may provide an incentive according to the realized cost reduction. In this case, the incentive information is stored in association with the user in the storage unit 13. An incentive is, for example, any factor or reward that can change a user's decision-making or behavior.

In S2, the control unit 11 determines an installer who installs the charger 51 for electric power feed and a retriever who removes the charger 51 from the electric power feed request. For example, when receiving information indicating the chargeable period from the user terminal 2, the control unit 11 extracts from the storage unit 13 one or more installers who can perform the installation work during the chargeable period and one or more retrievers who can perform the withdrawal work during the chargeable period. The storage unit 13 stores a list of one or more installers and one or more retrievers. The control unit 11 determines the installer SP and the retriever TP from the extracted one or more installers and one or more retrievers by an arbitrary method. Further, the control unit 11 determines the installation time according to the schedule of the installer SP. The control unit 11 determines the withdrawal time according to the schedule of the retriever TP. The control unit 11 determines the position of the vehicle PV or the user terminal 2 as the charging position.

Alternatively, installer SP and retriever TP may be the same. The installer terminal 3 and the retriever terminal 4 may be the same.

As shown in FIG. 6, the control unit 11 stores the following information in the storage unit 13 in association with the user.

Charging position
Installation time
Removal time
Installer
Retriever

Figure 5:
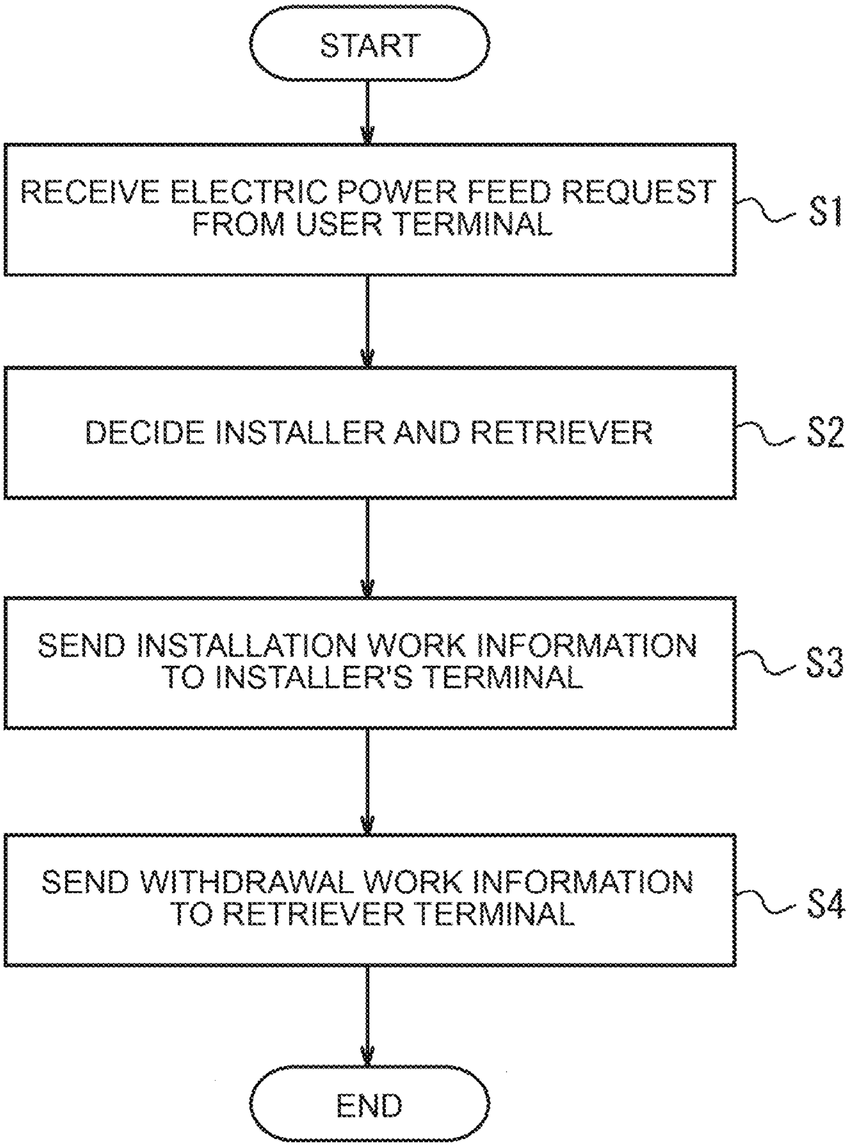
FIG. 5 is a flowchart showing the operation of the information processing device.

S3 and S4 of FIG. 5 may be performed in reverse order or simultaneously.

In S3, the control unit 11 transmits installation work information to the installer terminal 3. The installation work information includes, for example, information indicating the charging position, the installation time, and the installer. In S4, the control unit 11 transmits the withdrawal work information to the retriever terminal 4. The withdrawal work information includes, for example, information indicating the charging position, the withdrawal time, and the retriever.

The installer SP and the retriever TP work according to the installation work information and the dismantling work information, respectively. For example, the installer SP carries the portable charger 51 and rides the installer vehicle SV. When the installer SP arrives at the charging position before the installation time, the installer SP installs the charger 51. Specifically, the installer SP connects the charger 51 between the charging device 5 installed at a charging station or the like and the vehicle PV. The vehicle PV receives electric power feed from the charging device 5. The installer SP may leave the charging location after charging begins. The installer SP may perform the installation work or the withdrawal work in another vehicle.

The retriever TP gets on the retriever vehicle TV and arrives at the charging position before the withdrawal time. The retriever TP removes the charger 51 from the charging device 5 and the vehicle PV. After the charging is completed, the retriever TP leaves the charging position together with the charger 51. As an alternative example, the control unit 11 may notify the user terminal 2 that an incentive will be given to the user who brings the charger 51 to the designated collection location.

As an additional example, the control unit 11 may settle the charging fee in the registered account of the user P before charging is completed. As an alternative example, the retriever TP may perform face-to-face payment processing with the user after charging is completed.

As an additional example, the control unit 11 may monitor the charger 51 using at least one of position information of the charger 51, communication information of the charger 51, and an image of the charger captured by a monitoring camera installed at a charging station or the like. In this case, charger 51 includes a positioning unit and a communication unit. The control unit 11 can notify the terminal installed at the charging station of the location information of the charger 51 and the completion of charging.

As described above, according to the present embodiment, the operation of the control unit 11 is to receive an electric power feed request to the vehicle PV from the user terminal 2 and to install the charger 51 for electric power feed based on the electric power feed request, determining the installer, transmitting installation work information indicating at least the charging position and the installation time to the installer terminal 3, determining the retriever who performs the removal work of the charger 51 based on the electric power feed request, and sending to the retriever terminal 4 of the person withdrawing the withdrawal work information indicating at least the position and the withdrawal time. With this configuration, the information processing device 1 can make the installation work and the withdrawal work of the charger more efficient. For example, the information processing device 1 allows the installer SP to leave the charging position after charging is started, so the standby period of the installer SP during charging can be reduced. Accordingly, the information processing device 1 can reduce costs such as labor costs.

Further, according to the present embodiment, the operation of the control unit 11 is to receive information indicating the chargeable period from the user terminal 2 and to store one or more installers who can perform installation work during the chargeable period, extracting from the storage unit 13; and extracting from the storage unit 13 one or more retrievers who can perform the evacuating work during the chargeable period. With this configuration, the information processing device 1 can reliably secure the installer SP and the retriever TP.

Further, according to this embodiment, the charger 51 is portable, and at least one of the position information of the charger 51, the communication information of the charger 51, and the captured image of the charger 51 captured by the camera is stored, monitoring the charger 51 using the charging station, and notifying the terminal installed at the charging station of the location information of the charger 51 and the completion of charging. With this configuration, the information processing device 1 can reduce the theft of the charger 51.

Further, according to this embodiment, the operation of the control unit 11 includes notifying the user terminal 2 that an incentive will be given to the user who brings the charger 51 to the designated collection location. With this configuration, the information processing device 1 can reduce the necessity of arranging for the retriever TP.

Further, according to this embodiment, the installer SP and the retriever TP are the same, and the installer terminal 3 and the retriever terminal 4 are the same. With this configuration, the information processing device 1 can reliably secure the installer SP and the retriever TP even when there is little need to differentiate the installer SP and the retriever TP, such as when the charging period is short.

Although the present disclosure has been described above based on the drawings and the embodiment, it should be noted that those skilled in the art may make various modifications and alterations thereto based on the present disclosure. Other changes may be made without departing from the scope of the present disclosure. For example, the functions included in each means or step can be rearranged so as not to be logically inconsistent, and a plurality of means or steps can be combined into one or divided.

For example, in the above embodiments, a program for executing all or part of the functions or processes of the information processing device 1, the user terminal 2, the installer terminal 3, and the retriever terminal 4 can be recorded on a computer-readable recording medium. The computer-readable recording medium includes a non-transitory computer-readable medium such as a magnetic recording device, an optical disc, a magneto-optical recording medium, or a semiconductor memory. Programs are distributed by, for example, selling, assigning, or lending portable recording media such as Digital Versatile Discs (DVDs) or Compact Disc Read Only Memory (CD-ROMs) on which the programs are recorded. Further, the distribution of the program may be performed by storing the program in a storage of a server and transmitting the program from the server to another computer. Further, the program may be provided as a program product. The present disclosure can also be realized as a program that can be executed by a processor.

What is claimed is:

1. An information processing method performed by an information processing device, the information processing method comprising:

receiving an electric power feed request to feed electric power to a vehicle from a user terminal;

determining an installer to install a charger to feed the electric power to the vehicle and a retriever to retrieve the charger in response to the receiving of the electric power feed request;

transmitting installation work information to an installer terminal, the installation work information indicating at least a charging location and an installation time for installing the charger;

monitoring the charger using at least one of location information of the charger, communication information of the charger, or an image of the charger captured by a camera installed at the charging location;

transmitting a charge completion notification to a terminal installed at the charging location, the charge completion notification indicating that charging of the vehicle is completed and including the location information of the charger; and transmitting retrieval work information to a retriever terminal, the retrieval work information indicating at least the charging location and a retrieval time for retrieving the charger.

2. The information processing method according to claim 1, further comprising:

receiving information indicating a chargeable period from the user terminal;

extracting, from a storage unit, one or more installers that can perform the installation work during the chargeable period; and extracting, from the storage unit, one or more retrievers that can perform the retrieval work during the chargeable period.

3. The information processing method according to claim 1, further comprising notifying the user terminal that an incentive will be given to a user that brings the charger to a designated recovery location.

4. The information processing method according to claim 1, wherein the installer and the retriever are the same, and the installer terminal and the retriever terminal are the same.

* * * * *